(12) United States Patent
Cao (10) Patent No.: US 6,236,506 B1
(45) Date of Patent: May 22, 2001

(54) REFLECTION-TYPE OPTICAL CIRCULATION UTILIZING A LENS AND BIREFRINGENT PLATES

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/404,416

(22) Filed: Sep. 23, 1999

(51) Int. Cl.$^7$ ........................................................ G02B 5/30
(52) U.S. Cl. ........................ 359/484; 359/487; 359/495; 359/497; 359/112; 372/703
(58) Field of Search ...................................... 359/484, 487, 359/495, 497, 900, 117, 122, 124, 129, 131; 372/703

(56) References Cited

U.S. PATENT DOCUMENTS

| | | |
|---|---|---|
| 4,464,022 | 8/1984 | Emkey . |
| 4,482,202 | 11/1984 | Nagao . |
| 4,650,289 | 3/1987 | Kuwahara . |
| 4,859,014 | 8/1989 | Schmitt et al. . |
| 4,978,189 | 12/1990 | Blonder et al. . |
| 4,988,170 | 1/1991 | Buhrer . |
| 5,033,830 * | 7/1991 | Jameson . |
| 5,204,771 | 4/1993 | Koga . |
| 5,212,586 * | 5/1993 | Van Delden ........................ 359/484 |
| 5,319,483 | 6/1994 | Krasinski et al. . |
| 5,400,418 | 3/1995 | Pearson et al. . |
| 5,471,340 * | 11/1995 | Cheng et al. ........................ 359/495 |
| 5,574,596 | 11/1996 | Cheng . |
| 5,606,439 | 2/1997 | Wu . |

(List continued on next page.)

OTHER PUBLICATIONS

"Polarisation–Insensitive High–Isolation Nonreciprocal Device for Optical Circulator Application," *Electronic Letters*, 23$^{rd}$ May 1991, vol. 27 No. 11.

"High–isolation polarization–insensitive N–port optical circulator," *Applied Optics*, Mar. 1, 1997, vol. 36, No. 7.

"Polarization–Independent Optical Circulator Having High Isolation over a Wide Wavelength Range," Yohji Fujii,*IEEE* 1992.

"Magneto–optic circulator fop optical fiber transmission," *J. Appl. Phys.* 65(14), Feb. 15, 1989.

"Waveguide Polarization–Independent Optical Circulator," Sugimoto et al., *IEEE* 1999.

"High–Isolation Polarization–Independent Optical Circulator," Fujii, 1991 *IEEE*.

(List continued on next page.)

*Primary Examiner*—Ricky D. Shafer
(74) *Attorney, Agent, or Firm*—Sawyer Law Group LLP (57) ABSTRACT

The present invention provides a reflection-type improved optical circulator. The reflection-type optical circulator includes at least one birefringent plate for receiving at least one signal light ray from a first port; and a mirror optically coupled to the at least one birefringent plate, where the mirror and the at least one birefringent plate causes the at least one signal light ray to be folded back upon itself, where the at least one signal light ray is directed to a second port. The optical circulator in accordance with the present invention is a reflection-type optical circulator, in which the paths of throughgoing light rays are folded back upon themselves. This minimizes the number of required optical elements and the resultant device size by using each optical element two times for each light ray. Furthermore, the reflection-type optical circulator in accordance with the present invention can facilitate the alignment of the optical ports to the remaining optical elements because all ports can be disposed within a tightly constrained geometrical arrangement at only one side of the device.

8 Claims, 9 Drawing Sheets

U.S. PATENT DOCUMENTS

| | | | |
|---|---|---|---|
| 5,682,446 | | 10/1997 | Pan et al. . |
| 5,689,360 | * | 11/1997 | Kurata et al. ........................ 359/487 |
| 5,689,593 | | 11/1997 | Pan et al. . |
| 5,694,233 | | 12/1997 | Wu et al. . |
| 5,724,165 | | 3/1998 | Wu . |
| 5,768,005 | * | 6/1998 | Cheng et al. ........................ 359/497 |
| 5,867,291 | * | 2/1999 | Wu et al. . |
| 5,878,176 | * | 3/1999 | Cheng et al. . |
| 5,912,748 | | 6/1999 | Wu et al. . |
| 5,930,418 | * | 7/1999 | Chang . |
| 5,930,422 | * | 7/1999 | Cheng ................................. 359/484 |

OTHER PUBLICATIONS

"Wideband temperature–compensated optical isolator or circulator configuration using two Faraday elements," *Optics Letters*, vol. 14, No. 21, Nov. 1, 1989.

"High–Isolation Polarization–Independent Optical Circulator Coupled with Single–Mode Fibers," *Journal of Lightwave Technology*, vol. 9, No. 4, Apr. 1991.

"Quasi–Optical Ferrite Reflection Circulator," *IEEE Transactions on Microwave Theory and Techniques*, vol. 41, No. 12, Dec. 1993.

"Compact high–isolation polarization–independent optical circulator," *Optics Letters*, Feb. 1, 1993, vol. 18, No. 3.

"High–isolation polarization–independent optical quasi–circulator with a simple structure," *Optics Letters*, Apr. 1, 1998.

"High–Isolation Polarization–Insensitive Optical Circulator for Advanced Optical Communication Systems," *Journal of Lightwave Technology*, vol. 10, No. 9, Sep. 1992.

* cited by examiner

Figure 3
(SIDE VIEW)

Figure 4
(TOP VIEW)

Figure 7a (SIDE VIEW)

Figure 7b (TOP VIEW)

Figure 8

REFLECTION-TYPE OPTICAL CIRCULATION UTILIZING A LENS AND BIREFRINGENT PLATES

FIELD OF THE INVENTION

The present invention relates to optical systems, and more particularly to circulators in optical systems.

BACKGROUND OF THE INVENTION

Figure 1:
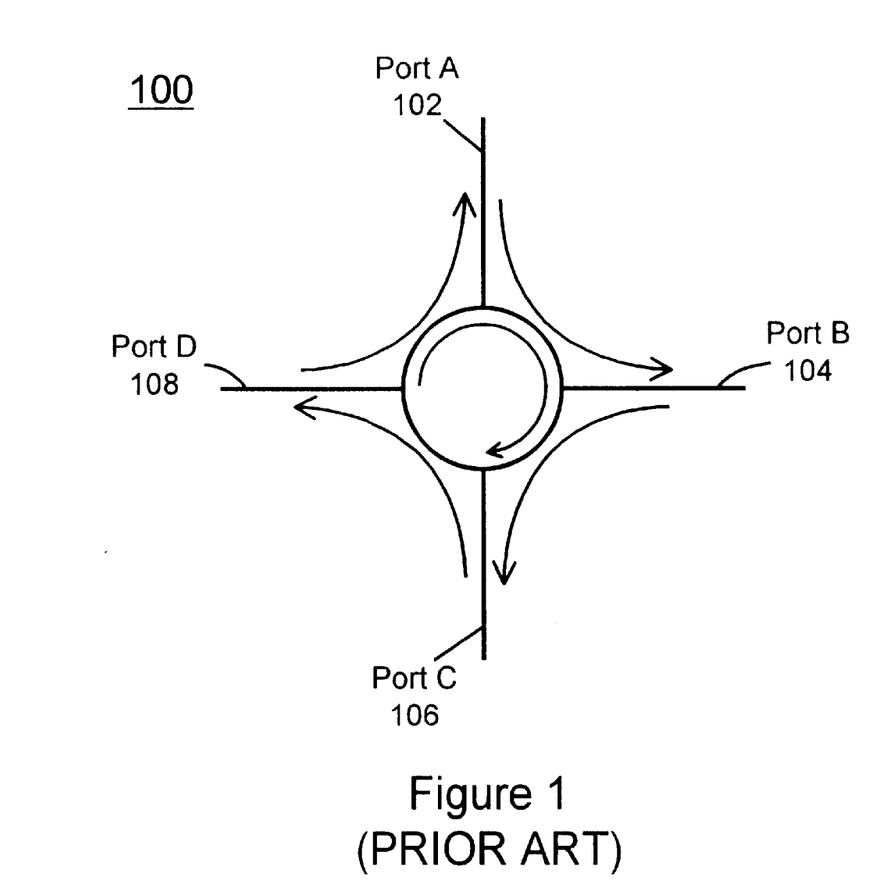
FIG. 1 is a general functional routing diagram for a conventional optical circulator.

The conventional optical circulator is a non-reciprocal multi-port routing and isolation component used in optical communications systems. FIG. 1 illustrates the operation of a generalized conventional four-port optical circulator 100. Light that enters the circulator 100 at port A 102 exits the optical circulator 100 at port B 104. However, light that enters the conventional optical circulator 200 at port B 104 does not travel to port A 102 but instead exits at port C 106. Similarly, light entering the port C 106 exits only at port D 108, and light entering port D 108 exits only at port A 102. In general, given a set of n equivalent optical input/output ports comprising a certain logical sequence within an optical circulator, light inputted to any port is outputted from the logical next port in the sequence and is prevented from being output from any other port. Since a light signal will travel only one way through any two consecutive ports of the optical circulator 100, such ports, in effect, comprise an optical isolator. By installing a reflector at one port of a generalized n-port optical circulator (where n≧4) such that light outputted from the port is reflected back into the same port, the circulator may then be utilized as an (n−1)-port circulator. Furthermore, by blocking or failing to utilize one port of a generalized n-port optical circulator (where n≧4), the device may be used as an (n−1)-port quasi-circulator.

The main application of optical circulators is in bi-directional optical fiber communications whereby two signals at the same wavelength may simultaneously propagate in opposite directions through a single fiber. In this way, optical circulators permit a doubling of the bit carrying capacity of an existing unidirectional fiber optic communication link since optical circulators can permit full duplex communication on a single fiber optic link.

Figure 2:
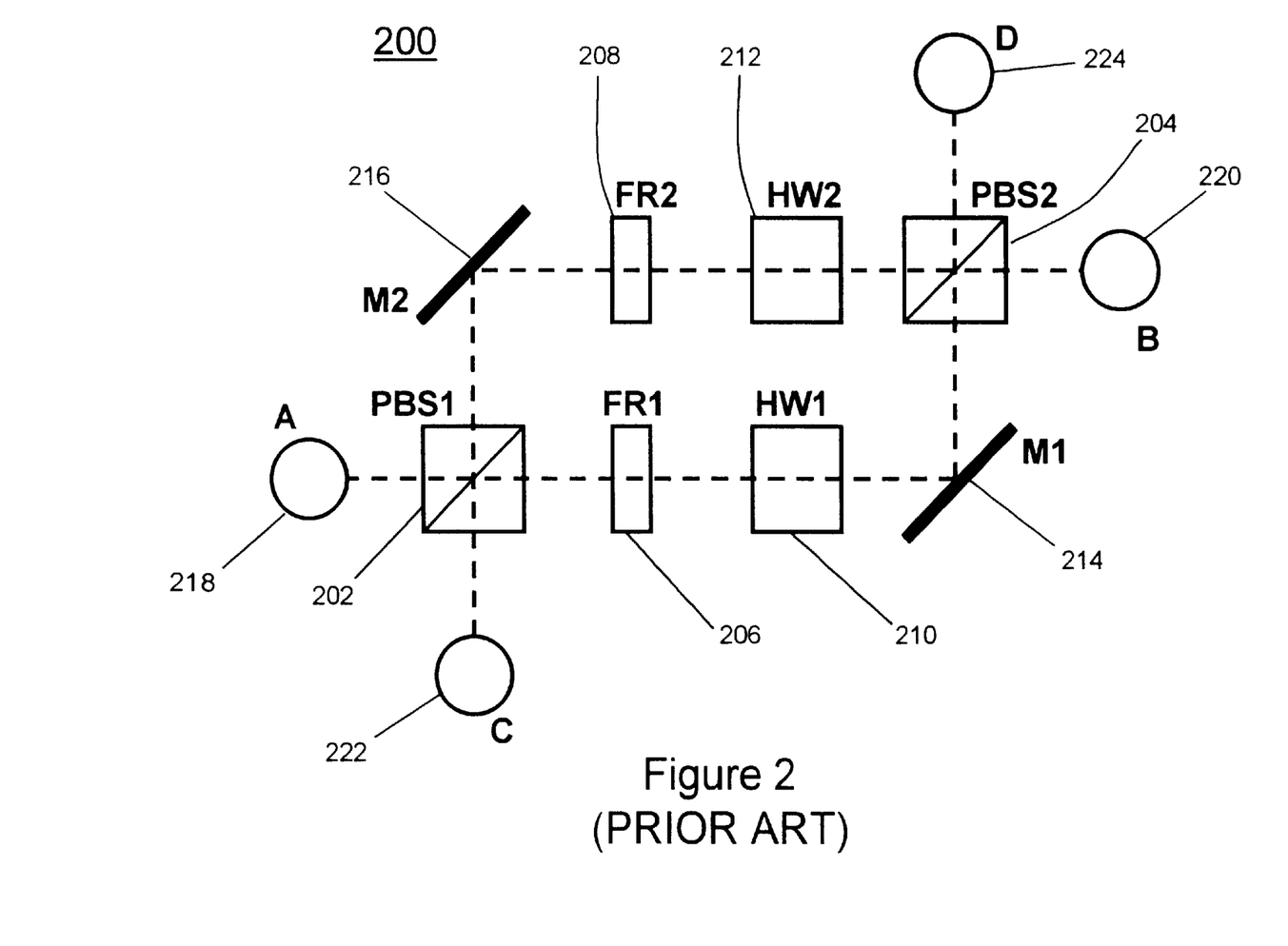
FIG. 2 is a diagram of components of a conventional optical circulator.

FIG. 2 shows the basic components of a conventional optical circulator. The optical circulator comprises two polarization beam splitters 202 and 204, two 45-degree Faraday rotators 206 and 208, two half-wave plates 210 and 212, two mirrors 214 and 216, and four fiber optic input and output ports 218, 220, 222, and 224. The two Faraday rotators 206 and 208 rotate the polarization plane of linearly polarized light 45 degrees in one direction (for instance clockwise) as viewed from a fixed reference point (for instance, the left side of FIG. 2), regardless of the direction of light input. The two half wave plates 210 and 212 also rotate polarized light 45 degrees, but the direction of rotation is constant (for instance clockwise) as viewed from the side at which light enters the plate. Signal light input comprising unpolarized light may be input from any one of the four ports 218–224 into either one of the two polarization beam splitters 202 or 204, which separate the light into two linearly polarized sub-signals, one p-polarized and the other s-polarized. These sub-signals propagate through the other optical elements. By inspection, it may be verified that light input at Port A 218 is transmitted to Port B 220, light input from Port B 220 is transmitted to Port C 222, light input from Port C 222 is transmitted to Port D 224, and light input from Port D 224 is transmitted to Port A 218. Thus, the circulator 200 is a 4-port optical circulator.

Other conventional circulator designs employ numerous stacked optical elements, such as waveplates, Faraday rotators and polarization beam splitters and optical input/output ports optically coupled to the stacked optics and disposed not all to one side of the apparatus. Such conventional arrangements are bulky and complex and cause difficulties for optical alignment.

Accordingly, there exists a need for an improved optical circulator. The improved optical circulator should minimize the number of required optical elements and should be easier to align than conventional optical circulators. The present invention addresses such a need.

SUMMARY OF THE INVENTION

The present invention provides a reflection-type improved optical circulator. The reflection-type optical circulator includes at least one birefringent plate for receiving at least one signal light ray from a first port; and a mirror optically coupled to the at least one birefringent plate, where the mirror and the at least one birefringent plate causes the at least one signal light ray to be folded back upon itself, where the at least one signal light ray is directed to a second port. The optical circulator in accordance with the present invention is a reflection-type optical circulator, in which the paths of throughgoing light rays are folded back upon themselves. This minimizes the number of required optical elements and the resultant device size by using each optical element two times for each light ray. Furthermore, the reflection-type optical circulator in accordance with the present invention can facilitate the alignment of the optical ports to the remaining optical elements because all ports can be disposed within a tightly constrained geometrical arrangement at only one side of the device.

DETAILED DESCRIPTION

The present invention provides an improved optical circulator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a reflection-type optical circulator in which the paths of throughgoing light rays are folded back upon themselves. This minimizes the number of required optical elements and the resultant device size by using each optical element two times for each light ray. Furthermore, the reflection-type optical circulator in accordance with the present invention can facilitate the alignment of the optical ports to the remaining optical elements because all ports can be disposed within a tightly constrained geometrical arrangement at only one side of the device. To more particularly describe the features of the present invention, please refer to FIGS. 3 through 8 in conjunction with the discussion below.

Figure 3:
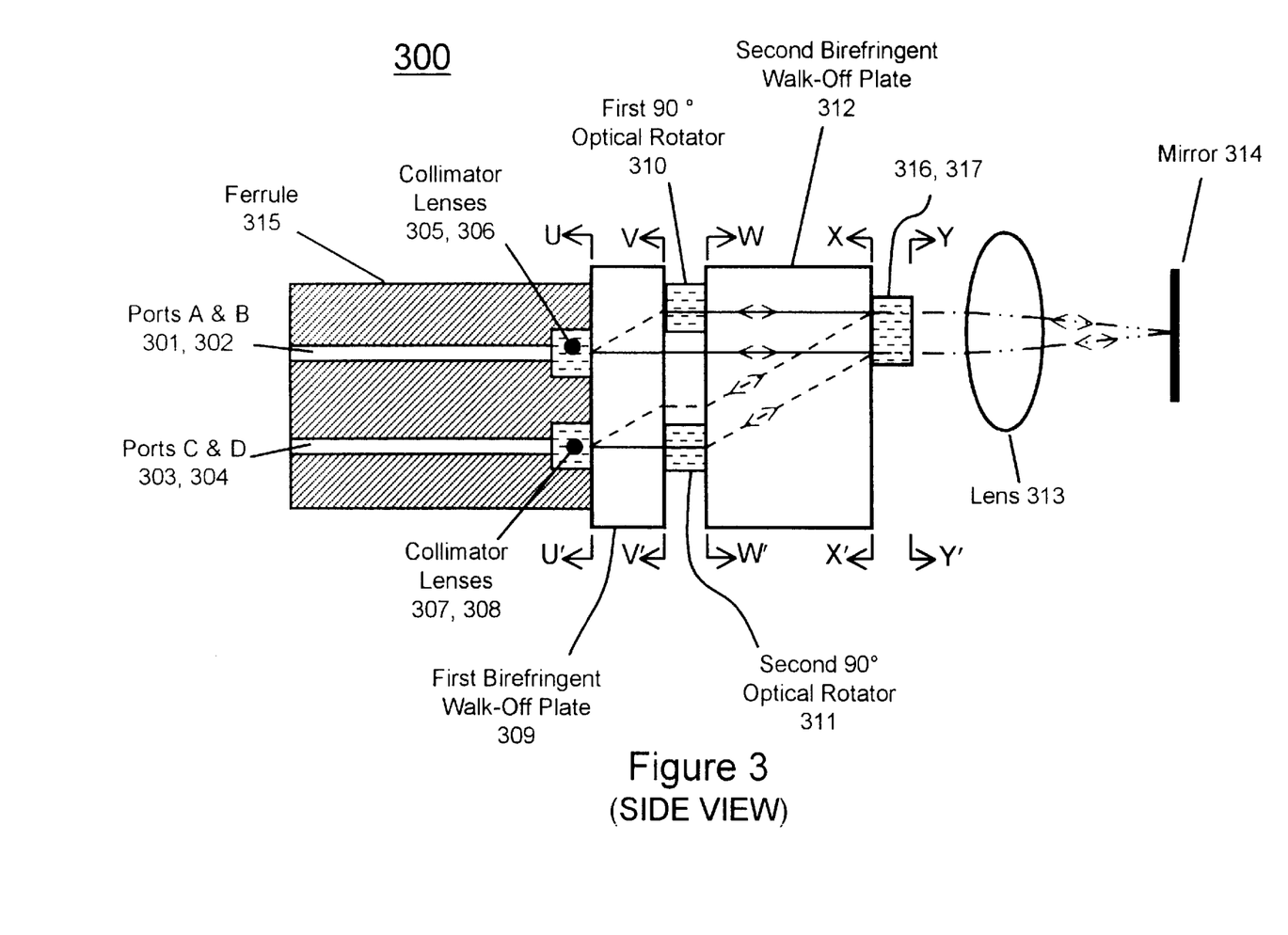
FIG. 3 is a side view of a first preferred embodiment of a circulator in accordance with the present invention.
Figure 4:
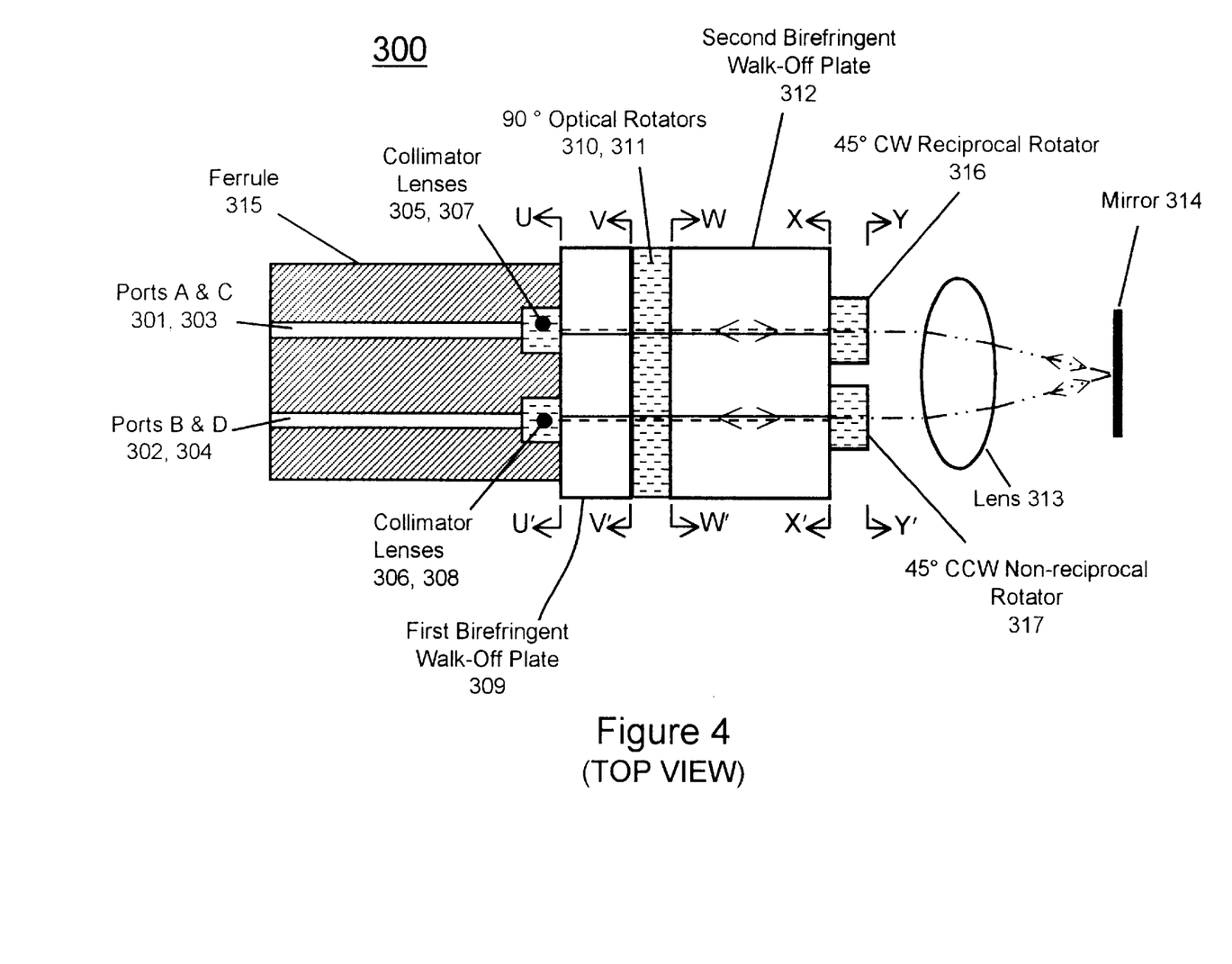
FIG. 4 is a top view of the first preferred embodiment of the circulator in accordance with the present invention.
Figure 5:
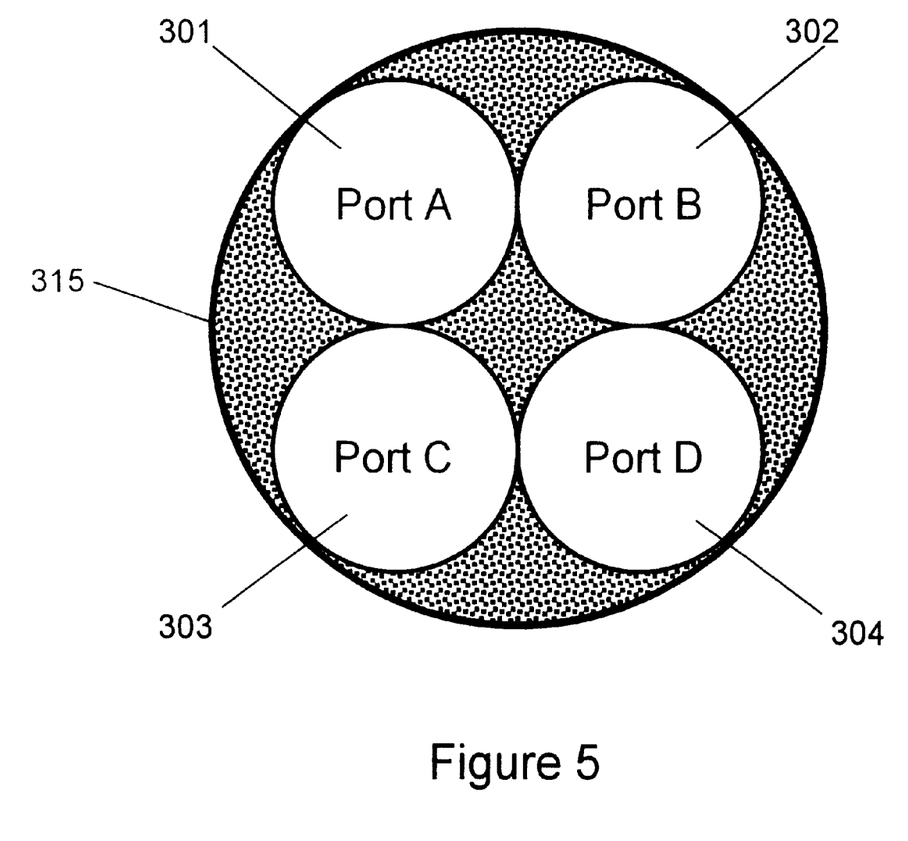
FIG. 5 is an end view of the port configuration of the input and output ports of the first preferred embodiment of the circulator in accordance with the present invention.

FIGS. 3 and 4 respectively show a side view and a top view of a first preferred embodiment of a circulator in accordance with the present invention. The first preferred embodiment of the circulator 300 comprises a ferrule 315 and four optical ports 301, 302, and 304 contained within or secured by ferrule 315. Preferably, such optical ports comprise optical fibers although they may comprise any type or combination of types of optical inputting and outputting device, such as windows. FIG. 5 shows an end view of the configuration of the four ports—Port A 301, Port B 302, Port C 303 and Port D 304—as viewed from the left side of the device of FIG. 3. As also shown in FIGS. 3 and 4, four collimator lenses 305, 306, 307 and 308, are disposed at the end of ferrule 315 such that each collimator receives light from and directs light to exactly one of the ports 301, 302, 303 and 304, respectively. Collimated light rays emanating from any of these four ports are parallel to one another and define the direction of the main axis of circulator 300.

Returning to FIG. 3, disposed adjacent to the end of ferrule 315 is a first birefringent walk-off plate 309 which has the property of separating any signal light ray emanating from any of the ports 301, 302, 303 or 304 into two physically separated linearly polarized sub-signal rays—one innermost and one outermost sub-signal ray. This separation of signals into sub-signals is accomplished by offset of the path of one—the e-ray—of each pair of sub-signals in a first direction perpendicular to the circulator main axis. Because four ports exist, eight separate sub-signals are so defined and are comprised of four outermost and four innermost sub-signals. The outermost and innermost sub-signals from both Port A 301 and Port B 302 comprise e-rays and o-rays, respectively, in their traverse through birefringent plate 309. Conversely, the outermost and innermost sub-signals from both Port C 303 and Port D 304 comprise o-rays and e-rays, respectively, in their traverse through birefringent plate 309.

Disposed adjacent to the first birefringent plate 309 and on the side of plate 309 opposite to ferrule 315 are both a first 310 and a second 311 optical rotator, respectively. These two optical rotators, 310 and 311, have the property of rotating the orientation of the plane of polarized light passing therethrough by 90° around or about the light propagation direction. In the preferred embodiment, both optical rotators 310 and 311 comprise half wave plates, although either or both may comprise some other type of optically active element such as a liquid crystal. Optical rotator 310 is disposed so as to intercept only the two outermost sub-signals arising from or destined for Port A 301 and Port B 302. Likewise, optical rotator 311 is disposed so as to intercept only the two outermost subsignals arising from or destined for Port C 303 and Port D 304.

A second birefringent walk-off plate 312 is disposed adjacent to the two reciprocal optical rotators 310 and 311 on the side opposite to the first birefringent plate 309. The thickness and optical orientation of birefringent plate 312 are chosen so as to provide an offset in the direction of one of the rays propagating therethrough by a distance equivalent to the common center-to-center inter-port separation distance.

As shown in FIG. 4, a pair of 45° optical polarization rotation elements—a reciprocal optical rotator 316 and a non-reciprocal optical rotator 317—are disposed to the side of the second birefringent walk-off plate 312 opposite to the 90° optical rotators 310 and 311. The reciprocal optical rotator 316 is disposed so as to intercept all and only those sub-signal light rays either emanating from or destined for Port A 301 and Port C 303. The polarization plane direction of linearly polarized light of sub-signals propagating through reciprocal optical rotator 316 is reversibly rotated by 45° in the clockwise (CW) direction. The non-reciprocal optical rotator 317 is disposed so as to intercept all and only those sub-signal light rays either emanating from or destined for Port B 302 and Port D 304. The polarization plane direction of linearly polarized light of sub-signals propagating through non-reciprocal optical rotator 317 is non-reversibly rotated by 45° in the counter-clockwise (CCW) direction. A lens or lens assembly 313 is disposed to the side of rotation elements 316 and 317 opposite to the second birefringent walk-off plate 312. Finally, a mirror 314 is disposed at the focal point of lens 313 opposite to the rotation elements 316 and 317.

As used in this specification, the terms "reciprocal optical rotator" or equivalently "reversible optical rotator" or "reciprocally rotating optical element" refer to optical components having the property such that the direction of rotation about the axis of light propagation, either clockwise (CW) or counter-clockwise (CCW), of the plane of polarization of linearly polarized light propagated therethrough is always the same when viewed facing the rotator towards the side at which the linearly polarized light beam enters the component. Conversely, the terms "non-reciprocal optical rotator" or equivalently "non-reversible optical rotator" or "non reciprocally rotating optical element" refer to optical components having the property such that the direction of rotation about the axis of light propagation, either clockwise (CW) or counter-clockwise (CCW), of the plane of polarization of linearly polarized light propagated therethrough is always the same when viewed facing the rotator from a fixed reference point in a fixed direction, regardless of the propagation direction of the light ray through the element.

Figure 6:
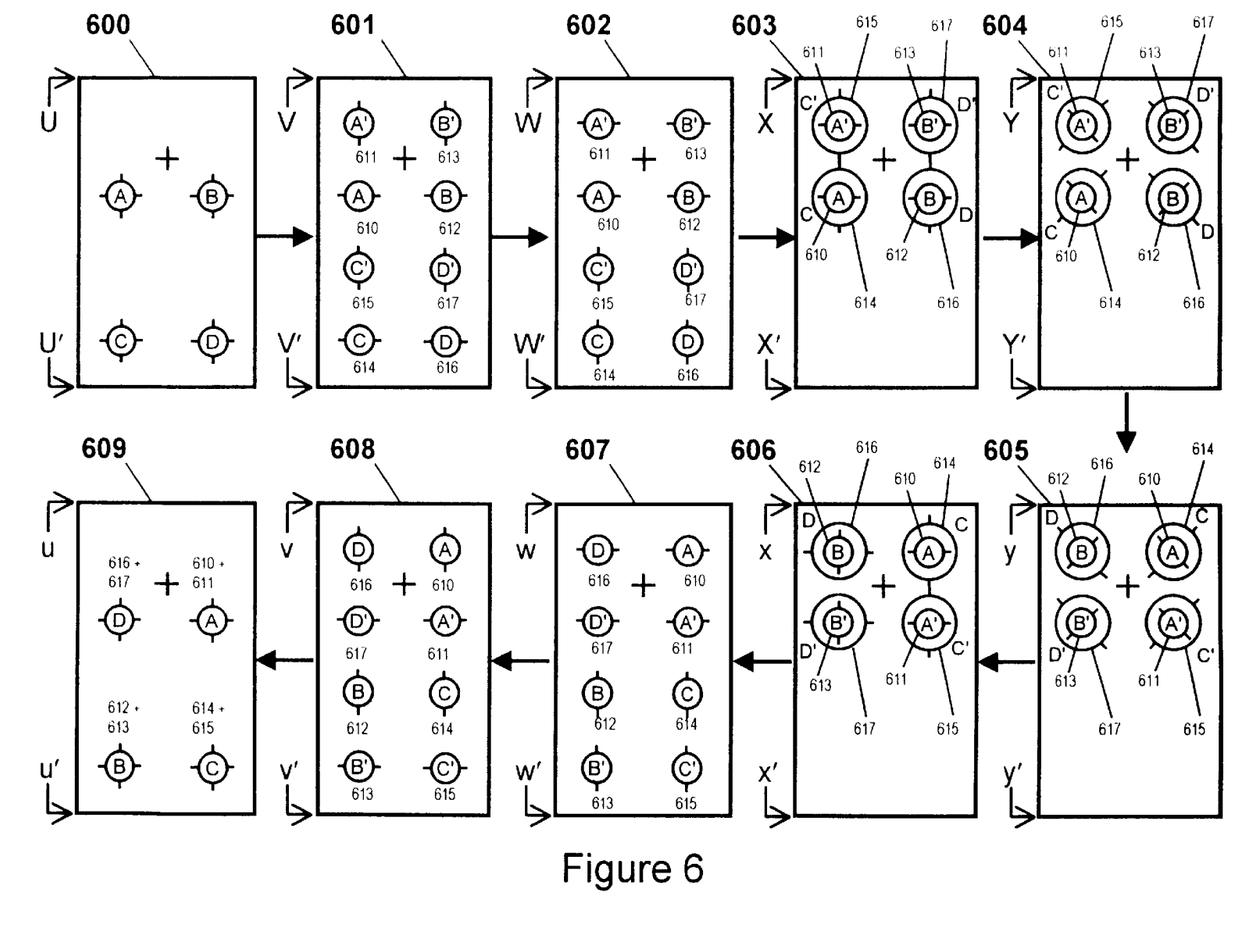
FIG. 6 is a sequence of cross sections through the first preferred embodiment of the circulator in accordance with the present invention.

The operation of circulator 300 is now described with reference to FIG. 6. FIG. 6 is a sequence of cross sections through the first embodiment of the circulator 300 illustrating the locations and polarization states of port images created by the light of signals and sub-signals propagating therethrough. These cross-sections are all drawn as viewed from the left side of the device 300 of FIG. 3 and are taken at the labeled cross-sectional planes U–U', V–V', W–W', X–X', and Y–Y'. These cross-sections correspond to locations similarly labeled on FIG. 3. In the cross sections of FIG. 6, the centers of labeled circles denote the positions of port images created by sub-signals propagating through circulator 300 as projected onto the respective cross section. Concentric circles of different sizes indicate overlapping or co-propagating sub-signals. The sizes of these circles in the diagrams of FIG. 6 have no physical significance. Barbs on the circles of FIG. 6 indicate the orientations of polarization planes of the linearly polarized sub-signals which the respective circles represent. Circles with two pairs of barbs represent unpolarized or randomly polarized light. A cross in each cross-section of FIG. 6 represents the projection of the center of the lens 313 onto said cross section along a line parallel to the circulator main axis.

As will be evident from the discussion following, all sub-signal light is reflected by the mirror 314 of circulator 300 so as to make one complete forward and one complete return traverse through circulator 300. Therefore, each cross-section of sub-signal port images is shown twice, one time labeled with capital letters to denote forward propagation (FIG. 6, upper row) and one time labeled with small letters (FIG. 6, lower row) to denote reverse propagation. Heavy arrows indicate the sequence of images produced by light signals propagating through circulator 300.

The paths of signals and sub-signals propagating through circulator 300 are now described with reference to FIG. 6. As seen in cross section U–U' 600 of FIG. 6, signals emanating from each of the four ports—Port A 301, Port B 302, Port C 303 and Port D 304—are comprised of randomly polarized light. After emanating from one of the four ports and passing through one of the collimator lenses 305–308, signal light enters and passes through the first birefringent plate 309 which separates it into physically separated horizontally and vertically polarized sub-signal components. In FIG. 6, sub-signal A 610, sub-signal B 612, sub-signal C 614 and sub-signal D 616 represent the images of horizontally polarized sub-signal light emanating, respectively, from Port A 301, Port B 302, Port C 303 and Port D 304. Likewise, sub-signal A' 611, sub-signal B' 613, sub-signal C' 615 and sub-signal D' 617 represent the images of vertically polarized sub-signal light emanating, respectively, from Port A 301, Port B 302, Port C 303 and Port D 304. It is noted the terms "vertical" and "horizontal" are used in this specification in a relative sense only and do not necessarily imply any particular spatial orientation of the referred-to apparatus or component.

The four vertically polarized sub-signals A' 611, B' 613, C' 615 and D' 617 all comprise e-rays during their traverse through the first birefringent plate 309. Therefore, as shown in cross-section V–V' 601, sub-signals 611, 613, 615 and 617 are all shifted or offset in the first direction with respect to the corresponding horizontally polarized sub-signals 610, 612, 614 and 616, respectively. After passing through the first birefringent plate 309, the outermost sub-signals A' 611 and B' 613 pass through 90° optical rotator 310 while outermost sub-signals C 614 and D 616 pass through 90° optical rotator 311. Therefore, the light rays of the sub-signals incur 90° rotations of the orientations of their polarization planes. Thus, as shown in cross section W–W' 602, the polarization plane directions of sub-signals A' 611 and B' 613 change from vertical to horizontal-whilst those of sub-signals C 614 and D 616 change from horizontal to vertical.

After passing the positions of the optical rotators 310 and 311, all sub-signals enter and pass through the second birefringent walk-off plate 312. The four vertically polarized sub-signals C' 615, D' 617, C 614 and D 616 traverse birefringent plate 312 as e-rays and are thus deflected in the first direction whilst the four horizontally polarized sub-signals A' 611, B' 613, A 610. and B 612 traverse birefringent plate 312 as undeflected o-rays. The optical orientation and thickness of birefringent plate 312 are chosen such that the lateral deflection of e-rays upon traversing therethrough is exactly equal to the center-to-center inter-port separation distance. For this reason, after passing through birefringent plate 312, the two sub-signal images C'615 and C 614 become superimposed on the sub-signal images A' 611 and A 610, respectively and the two sub-signal images D' 617 and D 616 become superimposed on the sub-signal images B' 613 and B 612, respectively. Furthermore, the two sub-signals comprising each pair of superimposed sub-signals each follow identical paths until later separated during their return paths. This superimposition of sub-signals is shown in cross sections 603–606 of FIG. 6.

After exiting plate 312, each pair of superimposed sub-signals, A' 611 and C' 615, A 610 and C 614, B' 613 and D' 617, and B 612 and D 616 travels along its own path with the two sub-signals comprising each pair remaining superimposed, one upon the other. The two pairs of sub-signals A' 611 and C' 615, and A 610 and C 614, which comprise all and only that light originating from Port A 301 and Port C 303, pass through the 45° reciprocal optical rotator 316. In passing through reciprocal optical rotator 316, the polarization plane directions of light comprising these four sub-signals 611, 615, 610, and 614 are all rotated by an angle of 45° CW around or about their propagation directions. The two pairs of sub-signals B' 613 and D' 617, and B 612 and D 616, which comprise all and only that light originating from Port B 302 and Port D 304, pass through the non-reciprocal optical rotator 317. In passing through non-reciprocal optical rotator 317, the polarization plane directions of light comprising these four sub-signals 613, 617, 612, and 616, are all rotated by an angle of 45° CCW around or about their propagation directions. Barbs in cross section Y–Y' 604 show the orientations of the polarization planes of light of the various sub-signals 610–617 after exiting elements 316 and 317.

The four pairs of sub-signals 610–617 travel to and through the lens 313, which brings them all to a common focal point at mirror 314. The mirror 314 immediately reflects all sub-signals 610–617 back along their return paths through circulator 300. Because the focal point of the lens 313 is on the plane of mirror 314, the four pairs of sub-signals immediately diverge from one another after being reflected by the mirror 314 and pass through lens 313 a second time in the reverse direction. The diverging pathways of the four pairs of returning sub-signals are set once again parallel to one another by lens 313. Because the projection of the center of lens 313 onto cross-section Y–Y' 604 is centrally located between the four pairs of port images and because the focal point of lens 313 is on mirror 414, the four pairs of sub-signals are directed back towards reciprocal optical rotator 316 and non-reciprocal optical rotator 317 along pathways which exactly superimpose upon those of forward propagating pairs of sub-signals.

Cross section y–y' 605 shows the locations of the pairs of superimposed sub-signal images at their points of return entry into reciprocal optical rotator 316 and non-reciprocal optical rotator 317. The focusing and re-collimation of sub-signal images by lens 313 causes the inversion of image positions about the center of the lens as projected onto cross-section y–y' 605. This inversion causes interchange of the positions of opposing pairs of sub-signals as projected onto cross-section y–y' 605. Thus, upon re-entry into either reciprocal optical rotator 316 or non-reciprocal optical rotator 317, as shown in cross-section y–y' 605, the location of the returning pair of sub-signal images B 612 and D 616 is the same as that of the forward propagating pair of sub-signals A' 611 and C' 615 (cross-section 604). Likewise, in cross-section y–y' 605, the locations of returning pairs of sub-signals A 610 and C 614, B' 613 and D' 617, and A' 611 and C' 615 are identical to those of forward propagating pairs of sub-signals B' 613 and D' 617, A 610 and C 614, and B 612 and D 616, respectively (cross-section 604).

Because of the inversion properties of lens 313, each of the returning sub-signals within circulator 300 encounters the optical rotation element—either the reciprocal optical rotator 316 or the non-reciprocal optical rotator 317—through which it did not pass during its forward path through circulator 300. Thus, after passing through lens 313 on their return traverse through circulator 300, the sub-signals B 612, B' 613, D 616 and D' 617 all pass through reciprocal optical rotator 316 and thus their light rays incur 45° CW rotations of the directions of their polarization planes. Because reciprocal optical rotator 316 is a reversible optical rotator and the sub-signal propagation in question is in the return direction, this rotation has an apparent CCW direction as viewed from the left side of the device 300 of FIG. 3 and as indicated in FIG. 6. The sub-signals A 610, A' 611, C 614 and C' 615 all pass through non-reciprocal optical rotator 317 and thus their light rays incur 45° CCW rotations of the directions of their polarization planes after passing through lens 313 on their return traverse through circulator 300. Because non-reciprocal optical rotator 317 is a non-reversible optical rotator, the rotation of the polarization planes of sub-signals passing therethrough is always in the CCW direction as viewed from the left side of the device 300 of FIG. 3. The polarization state of each of the sub-signals 610–617 after passing through either reciprocal optical rotator 316 or non-reciprocal optical rotator 317 in the return direction is therefore either horizontal or vertical as indicated in cross section x–x' 606 of FIG. 6.

During return passage through the second birefringent plate 312, the vertically polarized sub-signals B 612, C 614, B' 613 and C' 615 pass therethrough as deflected e-rays whilst the horizontally polarized sub-signals D 616, A 610, D' 617 and A' 611 pass therethrough as undeflected o-rays. For this reason, the two sub-signals comprising each pair of superimposed sub-signals become re-separated one from another upon passing through birefringent plate 312 a second time. The deflection of sub-signals B 612, C 614, B' 613 and C' 615 upon their second traverse through birefringent plate 312 is exactly equal and opposite to the deflection of sub-signals C' 615, D' 617, C 614, and D 616 and during their first traverse through this plate. Therefore, the locations of the images of the various sub-signals 610–617 after the second traverse through birefringent plate 312 are as shown in cross section w–w' 607 of FIG. 6.

After exiting the second birefringent plate 312, the outermost returning sub-signals D 616 and A 610 pass through optical rotators 310 while outmost returning sub-signals B' 613 and C' 615 pass through 90° optical rotator 311. Therefore their light rays incur 90° rotations of the orientations of their polarization planes. As a result of these rotations, the polarization plane directions of light of sub-signals D 616 and A 610 become vertical, and those of the light of sub-signals B' 613 and C' 615 become horizontal. The positions and polarization states of the various sub-signals 610–617 are thus as shown in cross section v–v' 608 after passing, in the return direction, the positions of the 90° optical rotators, 310 and 311.

Finally, all sub-signals 610–617 enter the first birefringent walk-off plate 309 in the return direction. The vertically polarized sub-signals D 616, A 610, B 612 and C 614 pass through plate 309 as deflected e-rays whilst the horizontally polarized sub-signals D' 617, A' 611, B' 613 and C' 615 pass through plate 309 as undeflected o-rays. The deflection of sub-signals D 616, A 610, B 612 and C 614 during return passage through plate 309 is exactly equal and opposite to the deflection of sub-signals A' 611, B' 613, C' 615 and D' 617 during their forward passage through this plate. Therefore, the vertically and horizontally polarized pairs of sub-signals A 610 and A' 611, B 612 and B' 613, C 614 and C' 615, and D 616 and D' 617 become recombined at the positions of the collimator lenses 305–308. Each of the collimator lenses focuses the return-path signal impinging thereon into the immediately adjacent port. As shown in cross section u–u' 609, therefore, the recombined signals are located such that the signals originally from Port A 301, from Port B 302, from Port C 303 and from Port D 304 are directed into Port B 302, Port C 303, Port D 304 and Port A 301, respectively. In this way, the first preferred embodiment of the circulator 300 functions as an optical circulator.

In circulator 300, the second birefringent walk-off plate 312 must be of the exact thickness and optical orientation so as to cause a lateral offset of e-rays equivalent to the center-to-center inter-port separation distance. This requirement may create difficulties in some circumstances.

Figure 7A:
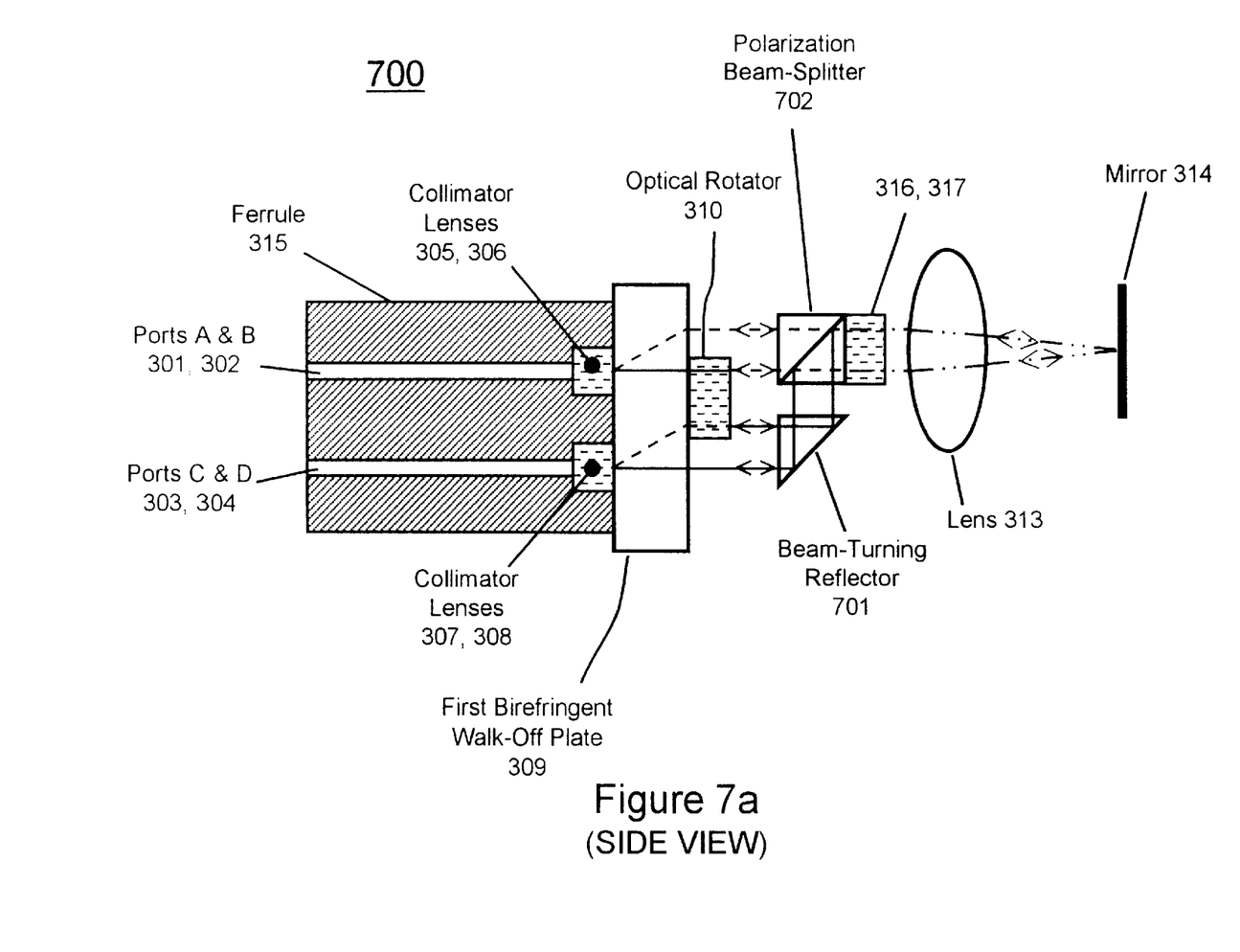
FIG. 7a is a side view of a second preferred embodiment of a circulator in accordance with the present invention.
Figure 7B:
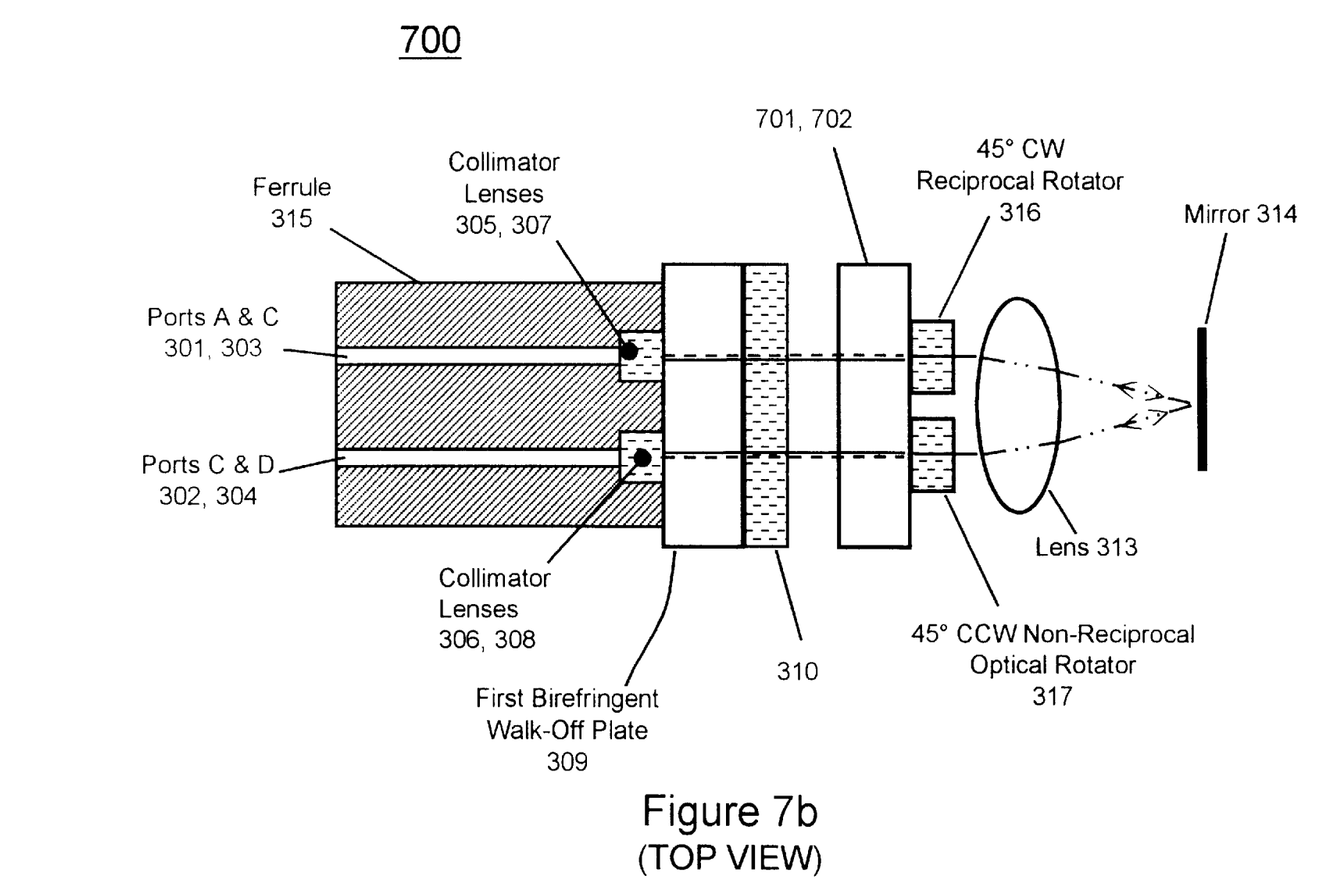
FIG. 7b is a top view of the second preferred embodiment of the circulator in accordance with the present invention.

FIGS. 7a and 7b illustrate a side and top view, respectively, of a second preferred embodiment of a circulator in accordance with the present invention. The second preferred embodiment eliminates the requirement of the thickness and optical orientation of the second birefringent walk-off plate 312 of the first preferred embodiment. The second preferred embodiment the circulator 700 comprises the ferrule 315, the four optical ports 301–304, the collimator lenses 305–308, the first birefringent plate 309, the first 90° optical rotator 310, the 45° optical rotators 316 and 317, the lens 313 and the mirror 314, which are common to the first preferred embodiment of the circulator 300. However, in the circulator 700, there is neither a second birefringent walk-off plate nor a second 90° optical rotator. Instead, there is a beam-turning reflector 701 and also a polarization beam splitter 702 both disposed between the first 90° optical rotator 310 and the 45° polarization rotators 316 and 317. Furthermore, as illustrated in FIG. 7a, the single 90° optical rotator 310 is disposed so as to intercept and rotate the polarization plane directions of only the innermost four rays or sub-signals emanating from or propagating towards the four input/output ports 301–304. Preferably, the beam-turning reflector 701 comprises a prism or mirror. The beam-tuning reflector 701 is disposed so as to intercept the signals emanating from Port C 303 and Port D 304 and turn their directions of propagation by approximately 90°. This turning direction is in the first direction, that is, in a direction such that the polarization beam splitter 702 subsequently intercepts these same signals. The polarization beam splitter 702 is disposed such that light of sub-signals emanating from Port A 301 and Port B 302 pass therethrough without deflection whilst light of sub-signals emanating from Port C 303 and Port D 304, after having been deflected by the beam-turning reflector 701, are deflected by approximately 90° by the polarization beam splitter 702. The combined deflections by beam-turning reflector 701 and polarization beam splitter 702 upon the propagation paths of signals emanating from Port C 303 and Port D 304 are such that, subsequent to passage through polarization beam splitter 702, sub-signals from Port A 301 and Port B 302 are superimposed upon those from Port C 303 and Port D 304, respectively.

Figure 8:
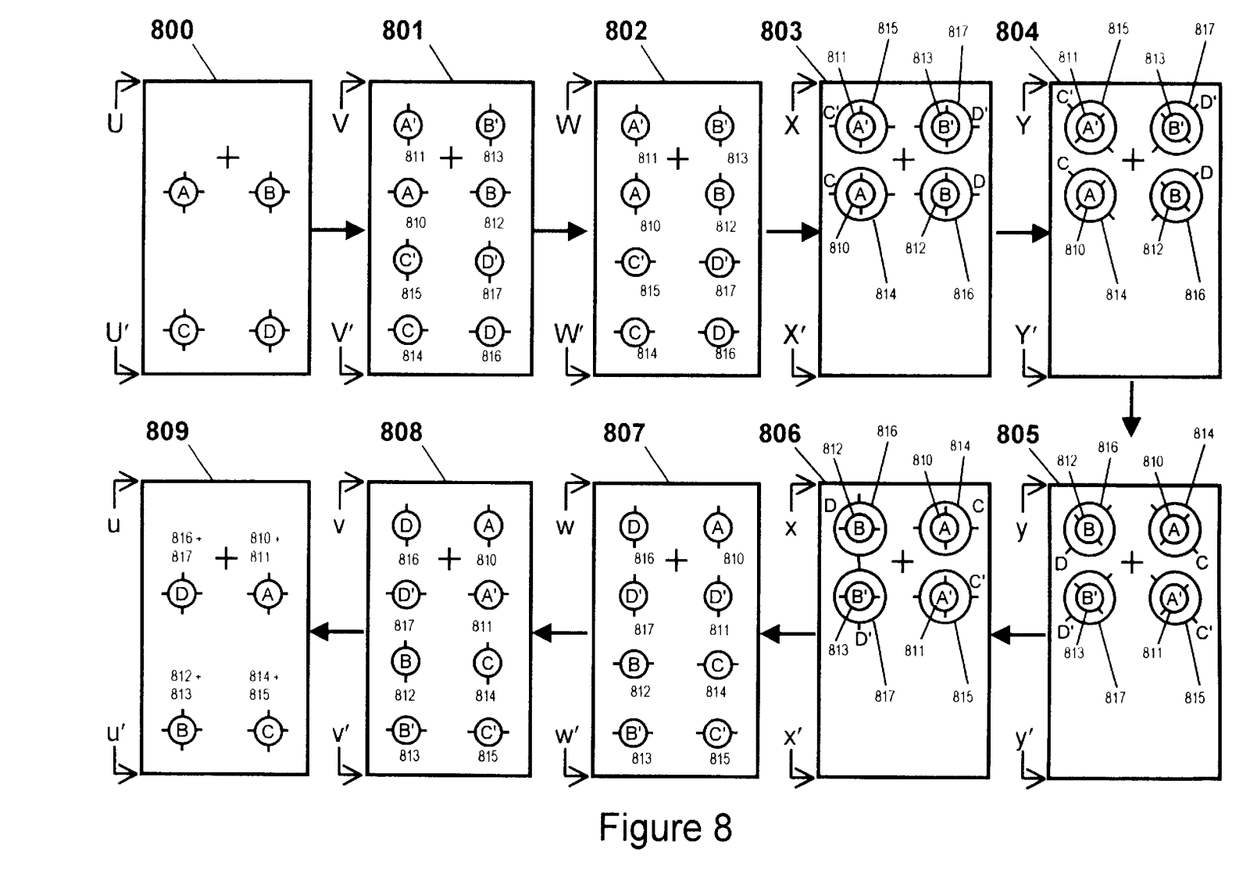
FIG. 8 is a sequence of cross sections through the second preferred embodiment of the circulator in accordance with the present invention.

The superimposition of sub-signals in the circulator 700 is identical to that already described for circulator 300 and is as exactly as shown in FIG. 6 or FIG. 8. The operation of circulator 700 is illustrated in detail in FIG. 8, which shows the locations and polarization states of signal and sub-signal rays passing therethrough. The signal-ray pathways and polarization states within circulator 700 illustrated in FIG. 8 are similar to those shown in FIG. 6 and described in reference thereto except that the cross-section X–X' 803 is disposed to the side of polarization beam splitter 702 facing lens 313 and the sub-signal polarization plane orientations are all rotated by 90° (relative to circulator 300) between cross-sections 802–807, inclusive, because of the different disposition of optical rotator 310 and absence of optical rotator 311, with respect to the circulator 300. The cross-sections 800–809 and sub-signals 810–817 of FIG. 8 pertaining to the operation of circulator 700 are analogous to the respective cross-sections 600–609 and sub-signals 610–617 of FIG. 6 pertaining to the operation of circulator 300.

The forward-propagating pathways of sub-signals C' 815, D' 817, C 814 and D 816 are all deflected by approximately 90° by the beam-turning reflector 701. Subsequently, these same sub-signal pathways are deflected by approximately 90° by the polarization beam splitter 702 such that, as shown in cross section X–X' 803 of FIG. 8, the sub-signals from Port A 301 and Port B 302 are superimposed upon those from Port C 303 and Port D 304, respectively. The sub-signals C' 815, D' 817, C 814, and D 816 are all horizontally polarized before entering beam-turning reflector 701. The beam-turning reflector 701 has the property that, after being deflected by and exiting beam-turning reflector 701, the sub-signals C' 815, D' 817, C 814, and D 816 all remain horizontally polarized. The horizontal polarization of sub-signals C' 815, D' 817, C 814, and D 816 comprises s-polarization with respect to the polarization beam splitter 702 and thus the paths of these sub-signals are deflected by approximately 90° at the polarization beam splitter 702. The sub-signals A' 811, B' 813, A 810, and B 812 are all vertically polarized before entering polarization beam splitter 702. This vertical polarization comprises p-polarization with respect to the polarization beam splitter 702 and thus these sub-signals are transmitted directly through beam splitter 702 without deflection. By this means, the sub-signals from Port A 301 and Port B 302 become superimposed upon those from Port C 303 and Port D 304, respectively. The separation of superimposed sub-signals within their return paths is also effected by polarization beam splitter 702 and beam-turning reflector 701 in a similar fashion.

Aside from the means of superimposing sub-signal images, other aspects of the operation of the second circulator embodiment, circulator 700, are identical to those already described for circulator 300 and are not described in further detail here. The second embodiment, circulator 700, has the advantage that a birefringent wedge of precise thickness and orientation is not required to superimpose the various sub-signal images. Precise positioning of the various sub-signals in circulator 700 may be accomplished by slight tilt adjustments of the beam-turning reflector 701 and/or the polarization beam splitter 702.

An improved optical circulator has been disclosed. The optical circulator in accordance with the present invention is a reflection-type optical circulator, in which the paths of throughgoing light rays are folded back upon themselves. This minimizes the number of required optical elements and the resultant device size by using each optical element two times for each light ray. Furthermore, the reflection-type optical circulator in accordance with the present invention can facilitate the alignment of the optical ports to the remaining optical elements because all ports can be disposed within a tightly constrained geometrical arrangement at only one side of the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A reflection-type optical circulator, comprising:
   a first birefringent plate for receiving at least one signal light ray from a first port, wherein the first birefringent plate separates the at least one signal light ray into a plurality of sub-signal rays;
   a second birefringent plate optically coupled to the first birefringent plate;
   at least one optical rotator optically coupled between the first and second birefringent plates, wherein the at least one optical rotator intercepts a portion of the plurality of sub-signal rays;
   at least one reciprocal optical rotator and at least one non-reciprocal optical rotator optically coupled to the second birefringent plate at a side opposite to the at least one optical rotator;
   a lens optically coupled to the at least one reciprocal optical rotator and the at least one non-reciprocal optical rotator at a side opposite to the second birefringent plate; and
   a mirror optically coupled to the lens at a side opposite to the at least one reciprocal optical rotator and the at least one non-reciprocal optical rotator,
   wherein the mirror reflects the plurality of sub-signal rays such that the plurality of sub-signal rays is folded back upon itself,
   wherein the at least one reciprocal optical rotator, the at least one non-reciprocal optical rotator, the at least one optical rotator, and the first and second birefringent plates recombine the reflected plurality of sub-signal rays into the at least one signal light ray, such that the recombined at least one signal light ray is directed to a second port.

2. A reflection-type optical circulator, comprising:
   a birefringent plate for receiving at least one signal light ray from a first port, wherein the birefringent plate separates the at least one signal light ray into a plurality of sub-signal rays;
   an optical rotator optically coupled to the birefringent plate, wherein the optical rotator intercepts a portion of the plurality of sub-signal rays;
   a beam-turning reflector optically coupled to the birefringent plate and to the optical rotator at a side opposite to the birefringent plate;
   a polarization beam-splitter optically coupled to the birefringent plate, the optical rotator at a side opposite to the birefringent plate, and the beam-turning reflector at a side perpendicular to the optical rotator;
   at least one reciprocal optical rotator and at least one non-reciprocal optical rotator optically coupled to the polarization beam-splitter at a side opposite to the optical rotator;
   a lens optically coupled to the at least one reciprocal optical rotator and the at least one non-reciprocal optical rotator at a side opposite to the polarization beam-splitter; and
   a mirror optically coupled to the lens at a side opposite to the at least one reciprocal optical rotator and the at least one non-reciprocal optical rotator,
   wherein the mirror reflects the plurality of sub-signal rays such that the plurality of sub-signal rays is folded back upon itself, wherein the at least one reciprocal rotator, the at least one non-reciprocal rotator, the polarization beam-splitter, the beam-turning reflector, the optical rotator, and the birefringent plate recombine the reflected plurality of sub-signal rays into the at least one signal light ray, such that the recombined at least one signal light ray is directed to a second port.

3. A reflection-type optical circulator, the optical circulator having four ports, comprising:
a first birefringent plate for receiving a plurality of signal light rays from the four ports, wherein the first birefringent plate separates the plurality of signal light rays into a plurality of sub-signal rays;
a second birefringent plate optically coupled to the first birefringent plate, wherein a thickness and optical orientation of the second birefringent plate is chosen so as to provide an offset in a direction of a sub-signal ray propagating therethrough by a distance equivalent to a common center-to-center inter-port separation distance;
a first and a second 90 degree optical rotator each optically coupled between the first and second birefringent plates, wherein the first and second 90 degree optical rotators each intercept a portion of the sub-signal rays from two of the four ports;
a 45 degree reciprocal optical rotator optically coupled to the second birefringent plate at a side opposite to the first and second 90 degree optical rotators, wherein the 45 degree reciprocal rotator intercepts the sub-signal rays from two of the four ports;
a 45 degree non-reciprocal optical rotator coupled to the second birefringent plate at a side opposite to the first and second 90 degree optical rotators, wherein the 45 degree non-reciprocal optical rotator intercepts the sub-signal rays from two of the four ports;
a lens optically coupled to the 45 degree reciprocal optical rotator and the 45 degree non-reciprocal optical rotators at a side opposite to the second birefringent plate; and
a mirror optically coupled to the lens at a side opposite to the 45 degree reciprocal optical rotators and the 45 degree non-reciprocal optical rotator,
wherein the mirror reflects the plurality of sub-signal rays such that the plurality of sub-signal rays is folded back upon itself,
wherein the 45 degree reciprocal optical rotator, the 45 degree non-reciprocal optical rotator, the first and second 90 degree optical rotators, and the first and second birefringent plates recombine the reflected plurality of sub-signal rays into the plurality of signal light rays, such that the recombined plurality of signal light rays are each directed to a different port from which it was received by the first birefringent plate.

4. A reflection-type optical circulator, the optical circulator having four ports, comprising:
a birefringent plate for receiving a plurality of signal light rays from the four ports, wherein the birefringent plate separates the plurality of signal light rays into a plurality of sub-signal rays;
an optical rotator optically coupled to the birefringent plate, wherein the optical rotator intercepts a portion of the plurality of sub-signal rays;
a 90 degree beam-tuning reflector optically coupled to the birefringent plate and to the optical rotator at a side opposite to the birefringent plate, wherein the 90 degree beam-turning reflector intercepts the sub-signal rays from two of the four ports;
a polarization beam-splitter optically coupled to the birefringent plate and to the optical rotator at a side opposite to the birefringent plate and to the 90 degree beam-turning reflector at a side perpendicular to the optical rotator, wherein the polarization beam-splitter defects the sub-signal rays from two of the four ports while allowing the sub-signal rays from the other two of the four ports to propagate therethrough without deflection;
a 45 degree reciprocal optical rotator optically coupled to the polarization beam-splitter at a side opposite to the optical rotator, wherein the 45 degree reciprocal optical rotator intercepts the sub-signal rays from two of the four ports;
a 45 degree non-reciprocal optical rotator optically coupled to the polarization beam-splitter at a side opposite to the optical rotator, wherein the 45 degree non-reciprocal optical rotator intercepts the sub-signal rays from two of the four ports;
a lens optically coupled to the at 45 degree reciprocal optical rotator and the 45 degree non-reciprocal optical rotator at a side opposite to the polarization beam-splitter; and
a mirror optically coupled to the lens at a side opposite to the 45 degree reciprocal optical rotator and the 45 degree non-reciprocal optical rotator,
wherein the mirror reflects the plurality of sub-signal rays such that the plurality of sub-signal rays is folded back upon itself,
wherein the 45 degree reciprocal optical rotator, the 45 degree non-reciprocal optical rotator, the polarization beam-splitter, the beam-turning reflector, the optical rotator, and the birefringent plate recombine the reflected plurality of sub-signal rays into the plurality of signal light rays, such that the recombined plurality of signal light rays are each directed to a different port from which it was received by the first birefringent plate.

5. A reflection-type optical circulator, comprising:
at least one birefringent plate for receiving at least one signal light ray from a first port, wherein the at least one birefringent plate comprises:
a first birefringent plate, wherein the first birefringent plate separates the at least one signal light ray into a plurality of sub-signal rays,
a second birefringent plate optically coupled to the first birefringent plate; at least one optical rotator optically coupled between the first and second birefringent plates, wherein the at least one optical rotator intercepts a portion of the plurality of sub-signal rays,
at least one reciprocal optical rotator and at least one non-reciprocal optical rotator optically coupled to the second birefringent plate at a side opposite to the at least one optical rotator, and
a lens optically coupled to the at least one reciprocal rotator and the at least one non-reciprocal optical rotator at a side opposite to the second birefringent plate; and
a mirror optically coupled to the at least one birefringent plate, wherein the mirror and the at least one birefringent plate causes the at least one signal light ray to be folded back upon itself, wherein the at least one signal light ray is directed to a second port.

6. A reflection-type optical circulator, comprising:
at least one birefringent plate for receiving at least one signal light ray from a first port;

a mirror optically coupled to the at least one birefringent plate, wherein the mirror and the at least one birefringent plate causes the at least one signal light ray to be folded back upon itself, wherein the at least one signal light ray is directed to a second port;

an optical rotator optically coupled to the at least one birefringent plate, wherein the at least one birefringent plate separates the at least one signal light ray into a plurality of sub-signal rays, wherein the optical rotator intercepts a portion of the plurality of sub-signal rays;

a beam-turning reflector optically coupled to the at least one birefringent plate and to the optical rotator at a side opposite to the at least one briefringent plate;

a polarization beam-splitter optically coupled to the at least one birefringent plate, the optical rotator at a side opposite to the at least one birefringent plate, and the beam-turning reflector at a side perpendicular to the optical rotator;

at least one reciprocal optical rotator and at least one non-reciprocal optical rotator optically coupled to the polarization beam-splitter at a side opposite to the optical rotator; and a lens optically coupled to the at least one reciprocal optical rotator and the at least one non-reciprocal optical rotator at a side opposite to the polarization beam-splitter.

7. A system for directing a signal light ray, comprising:

an optical network, the optical network comprising the signal light ray; and a reflection-type optical circulator comprising a plurality of ports, wherein the signal light ray is received at one of the plurality of ports, the reflection-type optical circulator further comprising:

at least one birefringent plate, wherein the at least one birefringent plate comprises:
  a first birefringent plate, wherein the first birefringent plate separates the at least one signal light ray into a plurality of sub-signal rays, and
  a second birefringent plate optically coupled to the first birefringent plate, a mirror optically coupled to the at least one birefringent plate, wherein the mirror and the at least one birefringent plate causes the signal light ray to be folded back upon itself, wherein the signal light ray is directed to another of the plurality of ports, at least one optical rotator optically coupled between the first and second birefringent plates, wherein the at least one optical rotator intercepts a portion of the plurality of sub-signal rays, at least one reciprocal optical rotator and at least one non-reciprocal optical rotator optically coupled to the second birefringent plate at a side opposite to the at least one optical rotator, and a lens optically coupled to the at least one reciprocal optical rotator and the at least one non-reciprocal optical rotator at a side opposite to the second birefringent plate.

8. A system for directing a signal light ray, comprising:

an optical network, the optical network comprising the signal light ray; and a reflection-type optical circulator comprising a plurality of ports, wherein the signal light ray is received at one of the plurality of ports, the reflection-type optical circulator further comprising:

at least one birefringent plate, a mirror optically coupled to the at least one birefringent plate, wherein the mirror and the at least one birefringent plate causes the signal light ray to be folded back upon itself, wherein the signal light ray is directed to another of the plurality of ports, an optical rotator optically coupled to the at least one birefringent plate, wherein the at least one birefringent plate separates the signal light ray into a plurality of sub-signal rays, wherein the optical rotator intercepts a portion of the plurality of sub-signal rays, a beam-turning reflector optically coupled to the at least one birefringent plate and to the optical rotator at a side opposite to the at least one birefringent plate;

a polarization beam-splitter optically coupled to the at least one birefringent plate and to the optical rotator at a side opposite to the at least one birefringent plate and to the beam-turning reflector at a side perpendicular to the optical rotator, at least one reciprocal optical rotator and at least one non-reciprocal optical rotator optically coupled to the polarization beam-splitter at a side opposite to the optical rotator, and a lens optically coupled to the at least one reciprocal optical rotator and the at least one non-reciprocal optical rotator at a side opposite to the polarization beam-splitter.

* * * * *